May 20, 1930.    H. J. BLAKESLEE    1,758,924
BOLT ANCHOR
Filed Aug. 22, 1928
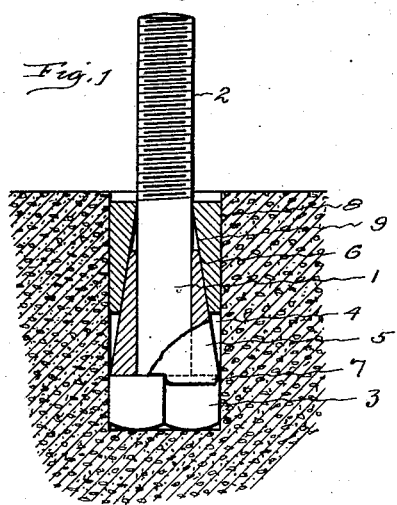
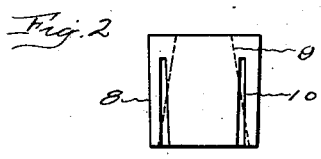
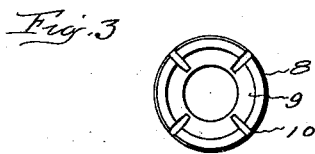
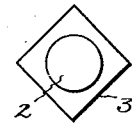
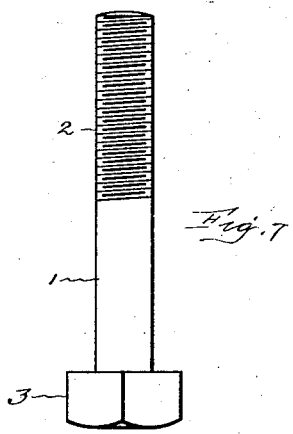
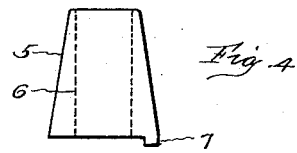
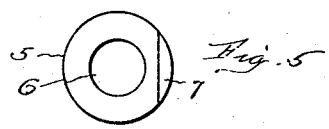
INVENTOR
Henry J. Blakeslee
by
Harry P. Williams
atty.

Patented May 20, 1930

1,758,924

UNITED STATES PATENT OFFICE

HENRY J. BLAKESLEE, OF WEST HARTFORD, CONNECTICUT

BOLT ANCHOR

Application filed August 22, 1928. Serial No. 301,217.

This invention relates to that class of articles which is adapted to be applied to bolts and utilized for anchoring the bolt heads in openings in masonry and other solid walls or ceilings.

The object of the invention is to provide an article of this character which is very cheap to manufacture, easy to manipulate for securing the bolt in position and which will hold with great firmness so that the bolt will not pull out of the hole or loosen and turn when a nut is being screwed upon it.

This object is attained by providing two members, a wedge member of relatively hard metal, such as cast iron, which has a conical exterior and a central perforation of a diameter to closely fit the shank of the bolt, said wedge member also having a lip that extends axially from the larger end which rests against the bolt head and is adapted to engage a face of the head of the bolt to prevent it from turning, and an expansible member made of relatively soft metal, as lead, which has a substantially cylindrical exterior of a size to fit the hole in which the bolt is to be anchored and a conical interior diameter shaped to fit the conical exterior of the wedge member, said expansible member also having longitudinally extending slots which ensure a uniform expansion and permit a desired distribution of the metal when the expansible member is on a bolt and is driven down into the hole in the masonry for anchoring the bolt head therein.

In the accompanying drawings Fig. 1 is a sectional view showing a bolt anchored in a hole in masonry by means embodying this invention. Fig. 2 is a side view of the expansible member. Fig. 3 is a bottom view of the expansible member. Fig. 4 is a side view of the wedge member Fig 5 is a bottom view of the wedge member Fig. 6 is an end view of a bolt that is adapted to be anchored in a hole by these members. Fig. 7 is a side view of the bolt.

The bolt 1 which is shown has a threaded shank 2 and a square head 3. The hole 4 in which the bolt is to be anchored is substantially round in cross-section and has a diameter that will just receive the bolt head.

The wedge member 5 of hard metal has a conical exterior wall, the larger diameter of which is substantially the same as the diameter of the hole in which the bolt is to be set, and it has an axial perforation 6 of a diameter that fits the bolt shank upon which the wedge member is slipped with the larger end resting against the under side of the bolt head. Extending axially from the larger end of the wedge member is a lip 7 that is designed, as illustrated in Fig. 1, to fit in a space between the wall of the hole and one face of the bolt head in order to prevent rotation of the bolt when the parts are set and a nut is screwed upon the bolt.

The expansible member 8 of ductile metal is practically cylindrical, the exterior diameter being substantially the same as the diameter of the hole, and it has an interior tapering opening 9 that is shaped to fit the bolt shank and the exterior of the wedge member. In the side wall of the expansible member are slots 10 that extend longitudinally from the bottom toward the top of the member and that are slightly wider at their lower ends than at their upper ends.

In use the bolt head is located at the bottom of the hole in the masonry, the hard wedge member is slipped upon the bolt shank until its larger end rests upon the bolt head and the lug extends down into the space between the head and the wall of the hole. The expansible member is then slipped upon the bolt shank and driven into the hole down upon the wedge member which causes the expansion of the expansible member tightly against the wall of the hole. Owing to its character and the slots in its walls the metal of the expansible member expands diametrically in a uniform manner without cracking, and it also spreads circumferentially so that the slots are practically closed, thus making this member substantially a solid plug in the hole. When the expansible member is thus driven in it is expanded against the walls of a hole and the bolt is very firmly held so that it cannot be drawn out and so that it will not turn when a nut is screwed upon it.

The invention claimed is:

Means for anchoring a bolt head in a hole, which comprises a wedge member of hard metal that has a conical exterior and a central longitudinal perforation adapted to fit the bolt shank, the larger diameter of said wedge member being adapted to fit the hole and having a lip adapted to fit between the wall of the hole and a face of the bolt head, and an expansible member of soft metal that has a cylindrical exterior adapted to fit the hole and a tapering central perforation shaped to fit the conical exterior of the wedge member, said expansible member also having slots extending longitudinally from its lower end.

HENRY J. BLAKESLEE.